United States Patent
Bergstrom

(10) Patent No.: US 7,860,103 B1
(45) Date of Patent: Dec. 28, 2010

(54) METHOD AND APPARATUS FOR EXTENDED ADDRESSING IN A FIBER CHANNEL ARBITRATED LOOP

(75) Inventor: April I. Bergstrom, Macungie, PA (US)

(73) Assignee: PMC-Sierra US, Inc., Santa Clara, CA (US)

( * ) Notice: Subject to any disclaimer, the term of this patent is extended or adjusted under 35 U.S.C. 154(b) by 634 days.

(21) Appl. No.: 11/693,939

(22) Filed: Mar. 30, 2007

Related U.S. Application Data

(60) Provisional application No. 60/870,504, filed on Dec. 18, 2006.

(51) Int. Cl.
*H04L 12/28* (2006.01)
*H04L 12/56* (2006.01)
(52) U.S. Cl. .................................. 370/395.2; 370/230
(58) Field of Classification Search .............. 370/395.2, 370/230
See application file for complete search history.

(56) References Cited

U.S. PATENT DOCUMENTS 5,751,715 A * 5/1998 Chan et al. .................. 370/455
2002/0196773 A1 * 12/2002 Berman ...................... 370/351
2003/0012204 A1 * 1/2003 Czeiger et al. .............. 370/401
2003/0108050 A1 * 6/2003 Black et al. ............. 370/395.51
2006/0072454 A1 4/2006 Ain et al.

* cited by examiner

*Primary Examiner*—Daniel Wu
*Assistant Examiner*—Frederick Ott
(74) *Attorney, Agent, or Firm*—Dennis R. Haszko

(57) ABSTRACT

Methods and apparatus for increasing the number of addressable node ports within one arbitrated loop are provided in a way that allows all node ports be able to participate in loop operations. The method also adds destination filtering based on the source address to determine which of the similarly addressed node ports a message is destined for. A unique arbitrated loop physical address is acquired by a connectivity device. A shared arbitrated loop physical address is acquired by each drive in a set of drives attached to the connectivity device. The shared arbitrated loop physical address is part of a set of shared arbitrated loop physical addresses that are shared among a plurality of connectivity devices. The drive can be uniquely addressed using a pairing of the shared loop physical address associated with the drive and the unique arbitrated loop physical address associated with the selected connectivity device.

10 Claims, 10 Drawing Sheets

Switched Fabric

Point-to-Point

Arbitrated Loop

METHOD AND APPARATUS FOR EXTENDED ADDRESSING IN A FIBER CHANNEL ARBITRATED LOOP

CROSS REFERENCE TO RELATED APPLICATIONS

This application claims the benefit of priority of U.S. Provisional Patent Application No. 60/870,504 filed on Dec. 18, 2006, which is incorporated herein by reference.

FIELD OF THE INVENTION

The present invention relates generally to device connectivity and addressing. More particularly, the present invention relates to addressing within a fiber channel arbitrated loop.

BACKGROUND OF THE INVENTION

Fiber Channel Arbitrated Loop (FC-AL) protocol provides simple, low-cost connectivity to multiple Fiber Channel (FC) devices without the expense of a fully switched fabric. The standard definition of an Arbitrated Loop allows for up to 126 participating node ports to communicate with one another in a single loop.

Three major Fiber Channel topologies are illustrated in FIGS. 1A-1C. An example of Arbitrated Loop as defined within the Fiber Channel standards is illustrated in FIG. 1A. A point-to-point topology, as illustrated in FIG. 1B, is the simplest topology but also the most limited. A switched fabric topology, as illustrated in FIG. 1C, provides interconnection for thousands of nodes and manages these connections but with high overhead. Arbitrated loop provides interconnection for up to 126 node ports without adding the complexity of the centralized switching function, since the switching function has been distributed to each of the nodes on the loop. The loop is a shared media between the ports connected to it. Ownership of the loop is arbitrated for among all the loop ports, after which the winning port gets to singly use the bandwidth of the loop.

The physical implementation of an arbitrated loop requires that all drives be connected together in a daisy chain fashion with the end of the chain connecting back to the beginning of the chain. Connecting drives directly to other drives can be problematic. The loop can become non-operational when inserting or removing a drive, and also if a drive or a connection to a drive becomes faulty. A connectivity device is commonly used within each enclosure of drives that completes the connections between the loop devices. FIGS. 2A and 2B illustrate loop configurations with different types of connectivity devices. FIG. 2A illustrates loop devices attached to a loop hub/port bypass controller 201. FIG. 2B illustrates loop devices attached to a loop switch device, such as a loop switch 211.

More node ports may be added to the loop beyond the limit of 126, but these ports cannot participate in the loop operations or communicate with other ports since they will not be able to acquire an address. To allow greater than 126 node ports in arbitrated loop, more than one arbitrated loop must be created. In the example illustrated in FIG. 3, each loop 301 and 302 connects to a switched fabric 303 through fabric ports 304 and 305, respectively. This arrangement extends the addressing range, but also increases cost.

To avoid the cost of adding a switched fabric to a low cost arbitrated loop, the addressing scheme needs to be extended. Also, the loop protocol that is used to create the connection between node ports will need to be enhanced at certain levels to utilize the extended addressing scheme.

Some advances regarding latency have made it possible to have more nodes without reaching saturation. However, in most cases there has not been a need to extend FC-AL addressing, since many customers saturate a loop with 70 drives and do not even use the full capacity of 126 addresses. As newer methods evolve to increase performance in the back-end of Fiber Channel storage arrays, there will be a desire to increase the number of drives within these arrays. Current solutions for increasing drive count within an FC-AL topology are costly and include adding a switched fabric, which also adds overhead.

It is, therefore, desirable to provide a scheme to extend FC-AL addressing that overcomes at least one drawback of previous approaches.

SUMMARY OF THE INVENTION

It is an object of the present invention to obviate or mitigate at least one disadvantage of previous FC AL addressing schemes. The present invention provides a method for extending the number of addressable nodes within a FC arbitrated loop.

Embodiments of the present invention apply an innovative method of addressing within the loop to re-use the available addresses and extend the number of addressable nodes. The method is compatible with existing FC-AL drives and the controller and connectivity devices that attach to the drives are still compatible with loop switches used in a star architecture. The new addressing method supplies an alternate means for zoning and virtual SAN partitioning. This addressing method also supplies the virtualization of the drives within an enclosure required to implement aggregation of traffic between the controller and drives.

In a first aspect, the present invention provides a method of routing communications at a connectivity device in a fiber channel arbitrated loop. The loop includes a plurality of connectivity devices and a plurality of sets of drives, each set of drives being connected to one of the connectivity devices. The method includes the following steps: receiving an open primitive having an arbitrated loop destination address and an arbitrated loop source address; examining both the arbitrated loop destination address and the arbitrated loop source address to determine whether a destination drive is connected to the connectivity device; and opening a connection between the initiating controller and the destination drive in response to a determination that the destination drive is connected to the connectivity device.

The step of examining both the arbitrated loop destination address and the arbitrated loop source address can include the following steps: comparing the arbitrated loop destination address to a unique arbitrated loop physical address associated with the connectivity device; and comparing the arbitrated loop source address to a shared arbitrated loop physical address associated with the destination drive. Alternatively, the step of examining both the arbitrated loop destination address and the arbitrated loop source address can include the following steps: comparing the arbitrated loop source address to a unique arbitrated loop physical address associated with the connectivity device; and comparing the arbitrated loop destination address to a shared arbitrated loop physical address associated with the destination drive. In either case, the shared arbitrated loop physical address can be part of a set of shared arbitrated loop physical addresses shared among the connectivity devices, the drive being uniquely addressable using a pairing of the shared loop physical address associated with the drive and the unique arbitrated loop physical address associated with the connectivity device to which the drive is connected.

The method can further include the step of forwarding the open primitive to another connectivity device in response to a determination that the destination drive is connected to the connectivity device.

In another aspect, the present invention provides a connectivity device for use in a fiber channel arbitrated loop. The loop includes a plurality of connectivity devices and a plurality of sets of drives, each set of drives being connected to one of the connectivity devices. A selected set of drives is connected to the connectivity device. The connectivity device includes the following elements: a receiver to receive an open primitive having an arbitrated loop destination address and an arbitrated loop source address; a processor to determine if the open primitive is destined for a drive attached to the connectivity device based on an examination of both the arbitrated loop destination address and the arbitrated loop source address; and a connection manager to open a connection between the initiating controller and the destination drive in response to a determination that the destination drive is connected to the connectivity device.

The connectivity device can include a primitive router to forward the open primitive when the processor determines that the open primitive is destined for a drive that is attached to another connectivity device. The connectivity device can further include an initialization controller to block the selected set of drives from being part of initialization of the loop and to force the set of drives to acquire certain arbitrated loop physical addresses based on bit settings in initialization frames.

In further aspect, the present invention provides a method of loop initialization in a fiber channel arbitrated loop. The loop includes a plurality of connectivity devices and a plurality of sets of drives, each set of drives being connected to one of the connectivity devices. The method includes the following steps: acquiring, at a selected connectivity device, a unique arbitrated loop physical address; and acquiring, at each drive in a set of drives attached to the selected connectivity device, a shared arbitrated loop physical address, the shared arbitrated loop physical address being part of a set of shared arbitrated loop physical addresses shared among the connectivity devices. The drive is uniquely addressable using a pairing of the shared loop physical address associated with the drive and the unique arbitrated loop physical address associated with the selected connectivity device.

In one embodiment, the unique arbitrated loop physical address comprises an arbitrated loop destination address and the shared arbitrated loop physical address comprises an arbitrated loop source address. In another embodiment, the unique arbitrated loop physical address comprises an arbitrated loop source address and the shared arbitrated loop physical address comprises an arbitrated loop destination address.

The method can further include, at the connectivity device: blocking the set of drives attached to the connectivity device from being part of initialization of the loop; and forcing the set of drives attached to the connectivity device to acquire certain arbitrated loop physical addresses based on bit settings in initialization frames.

The method can further include, at a controller: acquiring a controller unique arbitrated loop physical address for the controller. In one embodiment, the controller acquires as many unique arbitrated loop physical addresses as a maximum number of drives attached to each connectivity device connected to the controller. In alternate embodiments, the controller acquires as many unique arbitrated loop physical addresses as a maximum number of connectivity devices connected to the controller, or as a maximum number of enclosures in the loop, or as the maximum number of shelves in the loop.

In a yet further aspect, the present invention provides a fiber channel arbitrated loop addressing architecture. The architecture includes a plurality of unique arbitrated loop physical addresses for association with a plurality of controllers and a plurality of connectivity devices. The architecture also includes a set of shared arbitrated loop physical addresses for association with a plurality of sets of drives, each set of drives connected to one of the plurality of connectivity devices. The same set of shared loop physical addresses is re-usable by each set of drives to enable unique identification of a drive on the loop using a pairing of a shared loop physical address associated with the drive and a unique arbitrated loop physical address associated with a connectivity device to which the drive is connected.

In an embodiment of the addressing architecture, the plurality of unique arbitrated loop physical addresses comprise arbitrated loop destination addresses and the set of shared arbitrated loop physical addresses comprise an arbitrated loop source addresses. In another embodiment of the addressing architecture, the plurality of unique arbitrated loop physical addresses comprise arbitrated loop source addresses and the set of shared arbitrated loop physical addresses comprise an arbitrated loop destination addresses.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Figure 1C:
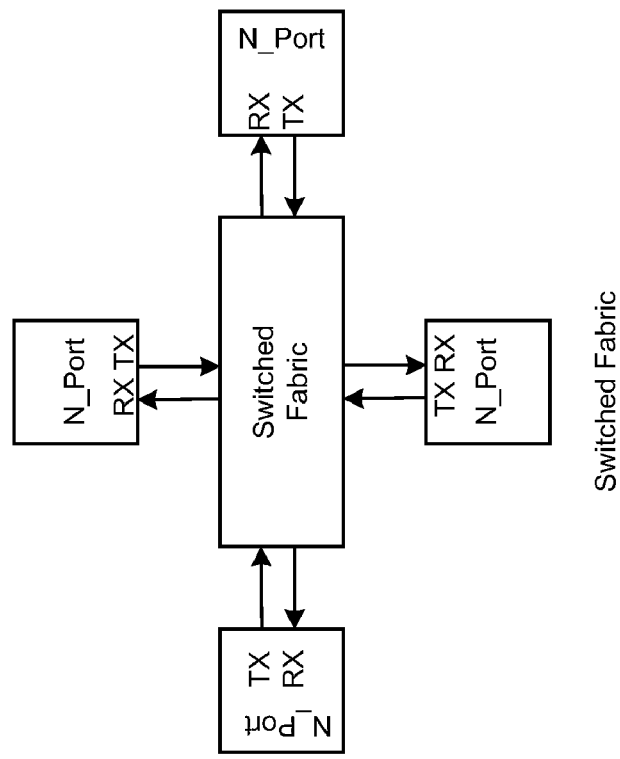
FIGS. 1A-1C illustrate known fiber channel topologies.
Figure 1B:
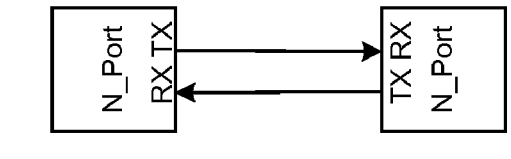
Figure 1A:
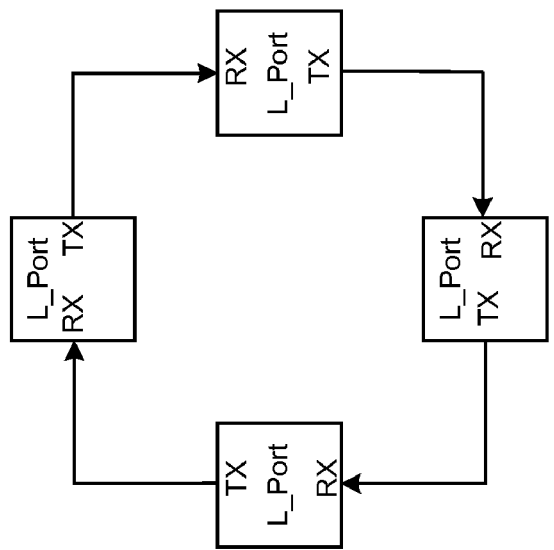
Figure 2A:
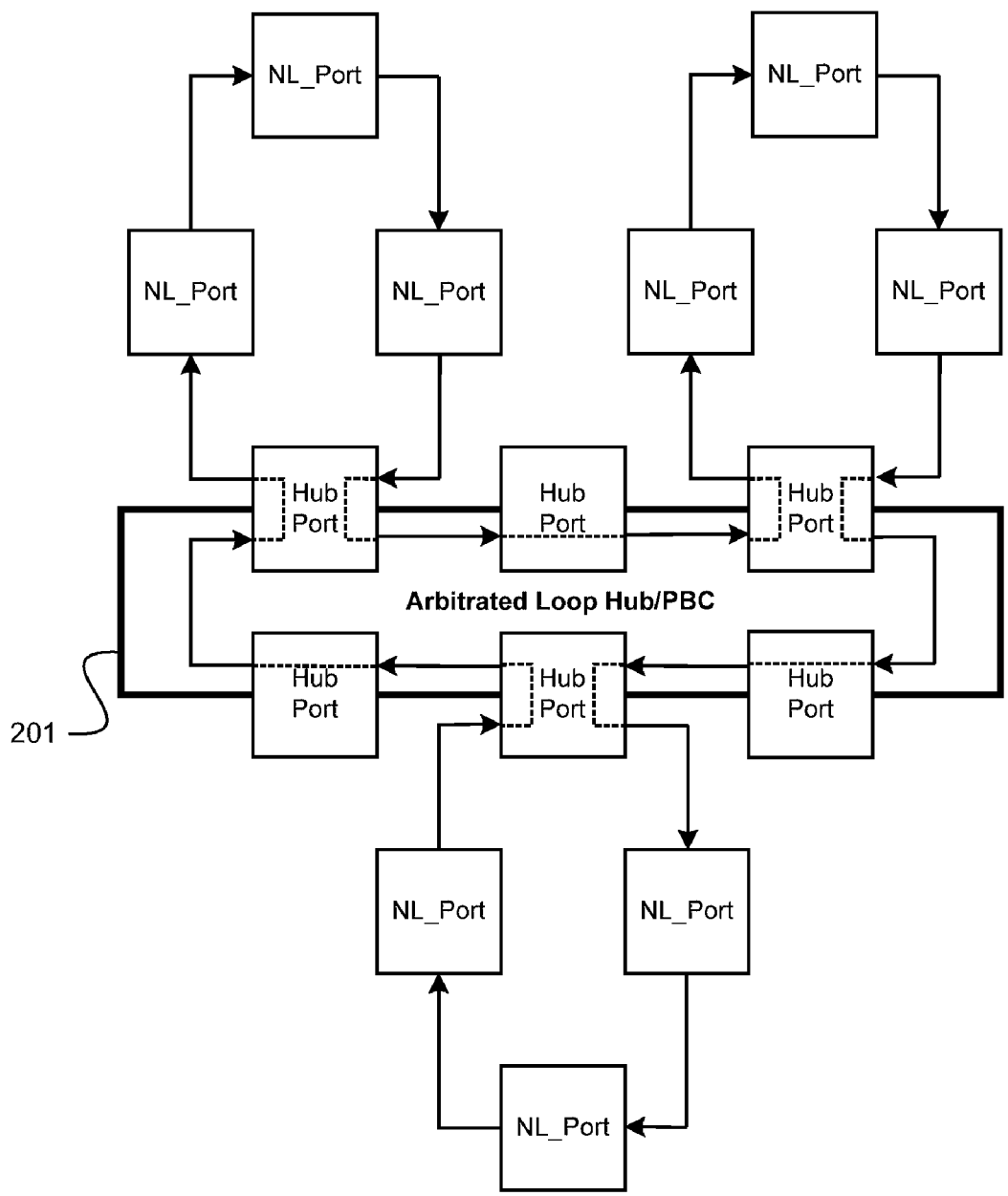
FIG. 2A illustrates loop devices attached to a loop hub/port bypass controller.
Figure 2B:
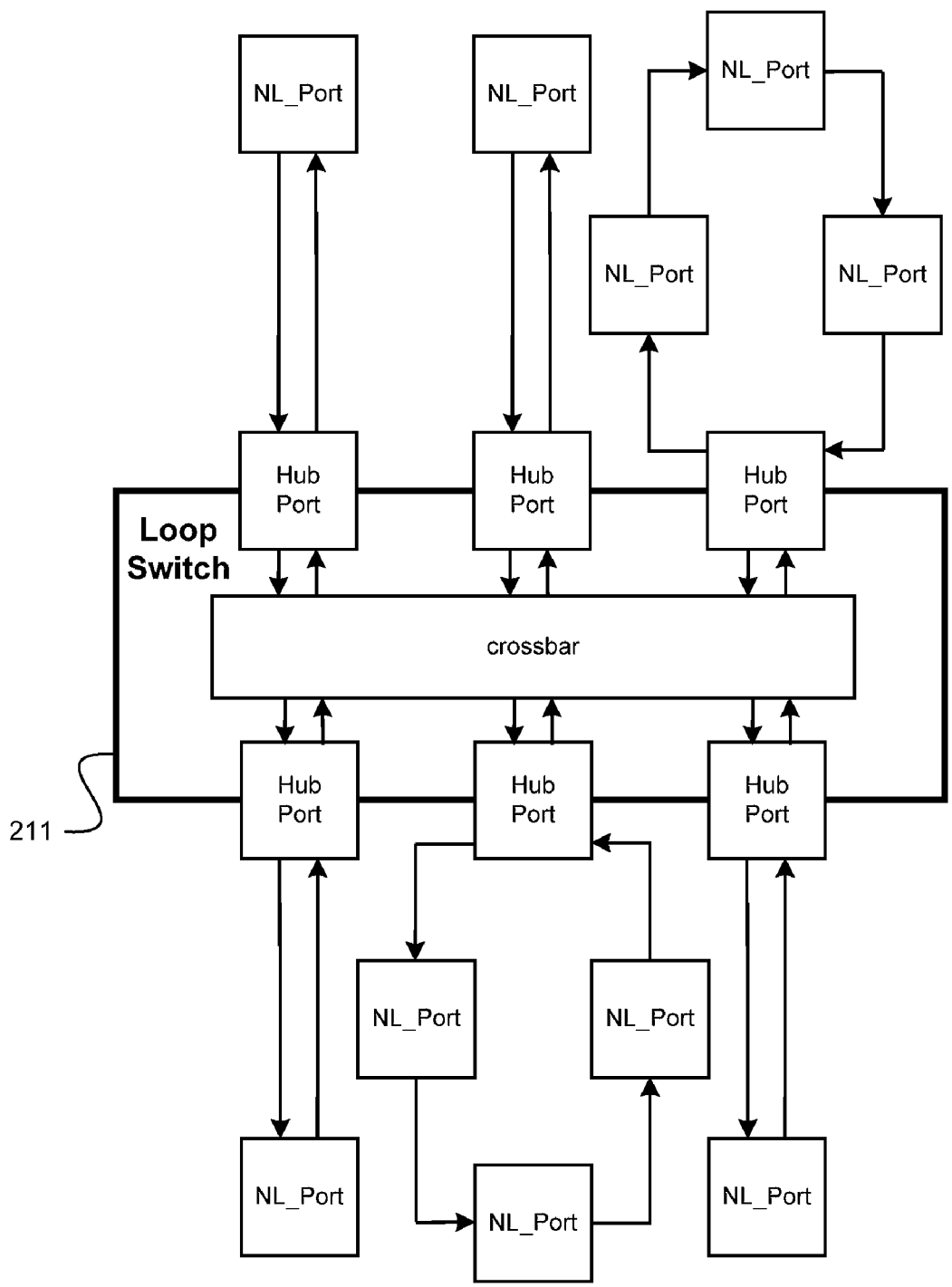
FIG. 2B illustrates loop devices attached to a loop switch.
Figure 3:
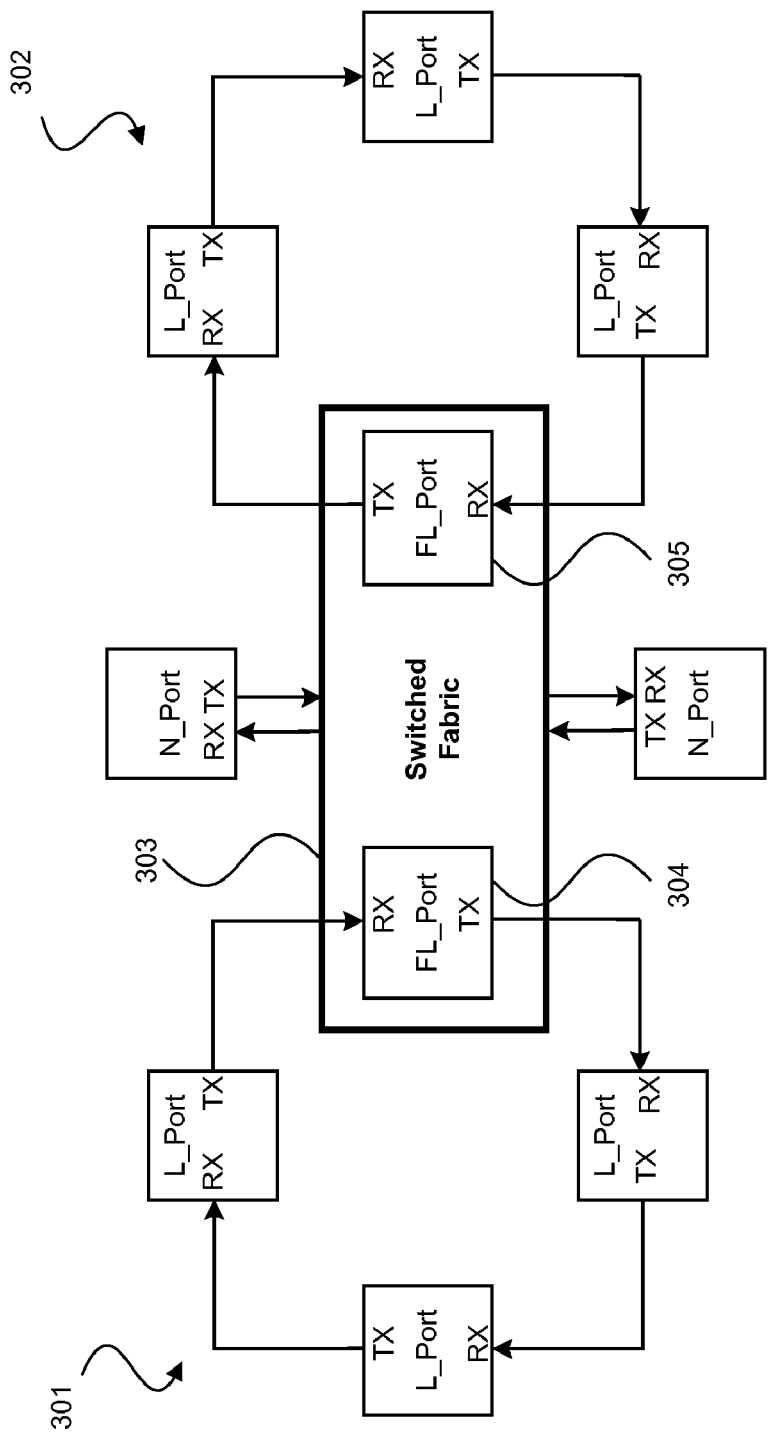
FIG. 3 illustrates a fabric attached loop topology.

Generally, the present invention provides methods and apparatus for increasing the number of addressable node ports within one arbitrated loop are provided in a way that allows all node ports be able to participate in loop operations. An embodiment allows for multiple node ports to acquire the same address within a single loop and have all node ports be able to participate in loop operations. The method also adds destination filtering based on the source address to determine which of the similarly addressed node ports a message is destined for. A unique arbitrated loop physical address is acquired by a connectivity device. A shared arbitrated loop physical address is acquired by each drive in a set of drives attached to the connectivity device. The shared arbitrated loop physical address is part of a set of shared arbitrated loop physical addresses that are shared among a plurality of connectivity devices. The drive can be uniquely addressed using a pairing of the shared loop physical address associated with the drive and the unique arbitrated loop physical address associated with the selected connectivity device.

The term "loop" as used herein refers to a fiber channel arbitrated loop. A "loop address" is an 8-bit value which is also the lower 8-bits of the 24-bit port address and can be referred to as a drive loop address. The loop address will also be referred to herein as an arbitrated loop physical address (AL_PA).

The term "drive" as used herein represents a device used for data storage, such as a hard disk drive, floppy disk drive, optical disk drive, DVD drive, tape drive, etc. Data can be transferred between drives using a number of interconnection schemes such as small computer system interconnect (SCSI), serial attached SCSI (SAS), serial advanced technology attachment (SATA), and each of their variants. Drives associated with these interconnection schemes each have their own storage, communication and/or cost advantages.

The term "connectivity device" as used herein represents any device that provides connectivity between drives. Examples of connectivity devices include a hub or loop hub, a cut-through switch, a loop switch, and a port bypass controller (PBC). Without a connectivity device, each of the drives in a loop would need to be hard wired to each other. Each drive can plug into a connectivity device and the connectivity device can include a cross-bar switch to determine which drives can communicate with each other. The connectivity device makes connections on the loop.

A connectivity device, such as a loop hub or loop switch, can contain logic to bypass a port either manually or automatically as controlled by monitoring of errors. A connectivity device can also include cut-through switching logic to remove the latency of the datastream being repeated by each of the drives between the two node ports that are communicating on the loop. More advanced architectures comprise loop switches which may or may not be buffered. Buffered loop switches allow for the virtualization of loop ports connected to it, which in turn allows for aggregation of traffic from different ports within one opened connection.

The term "enclosure" as used herein represents a physical enclosure or cabinet that houses one or more pieces of equipment. In embodiments of the present invention, an enclosure can house one or more connectivity devices, and a plurality of drives associated with the connectivity devices. An enclosure can be defined as a logical reference point on the loop, and in certain embodiments can be used to address or refer to connectivity devices and drives housed within the enclosure, such as by using a logical unit number (LUN).

The term "host controller" or "controller" as used herein represents a host adapter or host bus adapter (HBA) that connects a host system (typically a computer) to other network and storage devices. The term is primarily used to refer to devices for connecting Fiber Channel, eSATA, and SCSI devices, but devices for connecting to ESCON (Enterprise Systems Connection), Ethernet, and other systems may also be called host adapters.

The term "node port" as used herein represents a port that connects a node to a fabric via a fabric port, or to another node via a node port of the other node. A node port handles creation, detection, and flow of message units to and from the connected systems. Node ports are end points in point-to-point links. Physically, a node port is typically a drive or a controller. A drive can only act as a single node. Some controllers have node ports and can virtualize their node ports so that the device can acquire multiple AL_PAs; these devices use one port but can act as multiple nodes via multiple node ID technology.

Before describing embodiments of the present invention in detail, the concepts of loop initialization and connection setup in FC-AL will be discussed.

After power-up or whenever a drive is inserted into the arbitrated loop structure, loop initialization occurs to assign a loop address to each node on or attached to the loop. In FC-AL, there are only 127 allowed loop addresses, 126 for node ports and 1 that is always designated for a fabric port if one is attached to the loop. (The 127 allowed addresses are the subset of the 256 addresses possible that have neutral disparity when 8B/10B encoded.)

When a loop address is assigned to a node, the node port acquires the address during loop initialization. In an example of loop initialization, several frames are passed around that comprise a mapping of loop addresses. In the mapping, if a "1" is set in a certain position, it means that address is already taken. If a "0" is set, then a drive or node port can acquire that address and then set that particular bit to "1" before passing on the frame.

However, using known approaches, if more than 126 node ports are connected to the same loop, not all node ports will be able to acquire an AL_PA during loop initialization. Those node ports that cannot acquire an AL_PA will not be able to participate and communicate with any other node port on the loop until an active node port becomes inactive (possibly bypassing or powering down), allowing the non-participating port to acquire its AL_PA through another loop initialization.

The AL_PAs acquired by each node port are used to arbitrate for use of the loop and then to notify another port to open a connection to communicate. Whenever a node port has a frame to send to another node port, it will try to arbitrate for the loop. To arbitrate, the node port replaces IDLE primitives in the datastream it receives with an ARB primitive that contains the node port's acquired AL_PA before re-transmitting the datastream to the next port on the loop. The node port can also replace an ARB primitive that it receives that contains another port's AL_PA with an ARB primitive that contains its own AL_PA if its AL_PA has a higher priority (typically a lower AL_PA value) over that received. If the ARB that contains the node port's AL_PA within it makes it around the loop back to its own receive port, then that node port has won arbitration of the loop and may now set up a connection with another node port on the loop.

To set up a connection to another port after winning arbitration, a node port sends an OPN primitive which contains a source loop address, AL_PS, and a destination loop address, AL_PD. The AL_PS is the AL_PA of the node port that has won arbitration of the loop and is setting up the connection with another port. The AL_PD is the AL_PA of the node port for which the communication is destined. The OPN primitive is passed along the loop from node port to node port. According to known approaches, the node port or device cannot rout to other devices, but can only determine whether to accept or reject an incoming packet. If the AL_PD within the OPN is not that of the node port that receives it, that node port will pass the OPN along and act as a repeater. If the AL_PD within the OPN is that of the node port that receives it, then that node port will become opened, allowing data to be transferred to and from its higher level logic. Communication between the two connected ports proceeds with all other node ports just repeating the received traffic. Once the communication is complete, a CLS primitive is sent from each connected node port to notify the other connected node port to close its connection.

Embodiments of the present invention provide a way to re-use the standard addresses (AL_PAs) available in FC-AL for multiple node ports to extend the total number of addressable node ports on a single loop while complying with the standard arbitrated loop protocol. This is achieved without the added overhead associated with a fabric switch. Embodiments of the present invention rely on the common loop implementation of one or more controllers communicating to multiple enclosures that each house multiple drives that utilize a connectivity device such as a hub, cut-through switch or loop switch type of device for connectivity between the drives.

Each controller on the loop acquires multiple AL_PAs and can source frames from any of these AL_PAs and can also respond to communication directed towards any of these AL_PAs. As part of these embodiments, the connectivity device within each enclosure has an added capability that it can either filter communication to the drives based on the source AL_PA or can further direct communication to a specific drive based on the source AL_PA. Thus, the connection is established between controllers and drives based on a pairing of source and destination AL_PAs not just on the destination AL_PA as defined in a strictly standard loop implementation.

According to embodiments of the present invention, a connectivity device can block the drives from being part of the main loop's initialization and then can initiate loop initialization with each drive or all the drives connected to it depending on which method of address extending is being used. The connectivity device can then force the drive to acquire certain addresses by setting bits in the initialization frames and only having one or a few bit set to "0". Initialization, arbitration and addressing methods are described further below. Drive discovery is not specifically discussed since this can be implemented in many ways either in-band or out-of-band, as is known to one of skill in the art.

In each of the methods according to embodiments of the present invention, both the arbitrated loop source address and the arbitrated loop destination address are used to uniquely identify a drive. By using the pairing of both addresses to uniquely identify a drive, as opposed to only the destination address, some of the arbitrated loop source/destination addresses are shared, i.e. are not unique. This extension of the addressing scheme also allows all node ports to participate in loop operations.

According to an embodiment of the present invention, a unique arbitrated loop physical address is acquired by a selected connectivity device. A shared arbitrated loop physical address is acquired by each drive in a set of drives attached to the selected connectivity device. The shared arbitrated loop physical address is part of a set of shared arbitrated loop physical addresses that are shared across/among the connectivity devices. The drive is uniquely addressable using a pairing of the shared loop physical address associated with the drive and the unique arbitrated loop physical address associated with the selected connectivity device.

Embodiments of the present invention can be described as providing a fiber channel arbitrated loop addressing architecture. The architecture includes a plurality of unique arbitrated loop physical addresses for association with a plurality of controllers and a plurality of connectivity devices. The architecture also includes a set of shared arbitrated loop physical addresses for association with a plurality of sets of drives, each set of drives connected to one of the plurality of connectivity devices. The same set of shared loop physical addresses is re-usable by each set of drives to enable unique identification of a drive on the loop using a pairing of a shared loop physical address associated with the drive and a unique arbitrated loop physical address associated with a connectivity device to which the drive is connected.

Three different methods of utilizing the arbitrated loop source address, AL_PS, and the arbitrated loop destination address, AL_PD, to identify which drive on the loop is the destination will now be described. In one embodiment, the shared arbitrated loop physical address is an AL_PD and the unique arbitrated loop physical address is an AL_PS. In another embodiment, the shared arbitrated loop physical address is an AL_PS and the unique arbitrated loop physical address is an AL_PD. In a further embodiment, each drive is uniquely identified by a pairing of AL_PD and AL_PS, but neither the AL_PD nor the AL_PS identifies the connectivity device to which the drive is connected. In this further embodiment, the connectivity device does not acquire a unique arbitration loop address.

Figure 4:
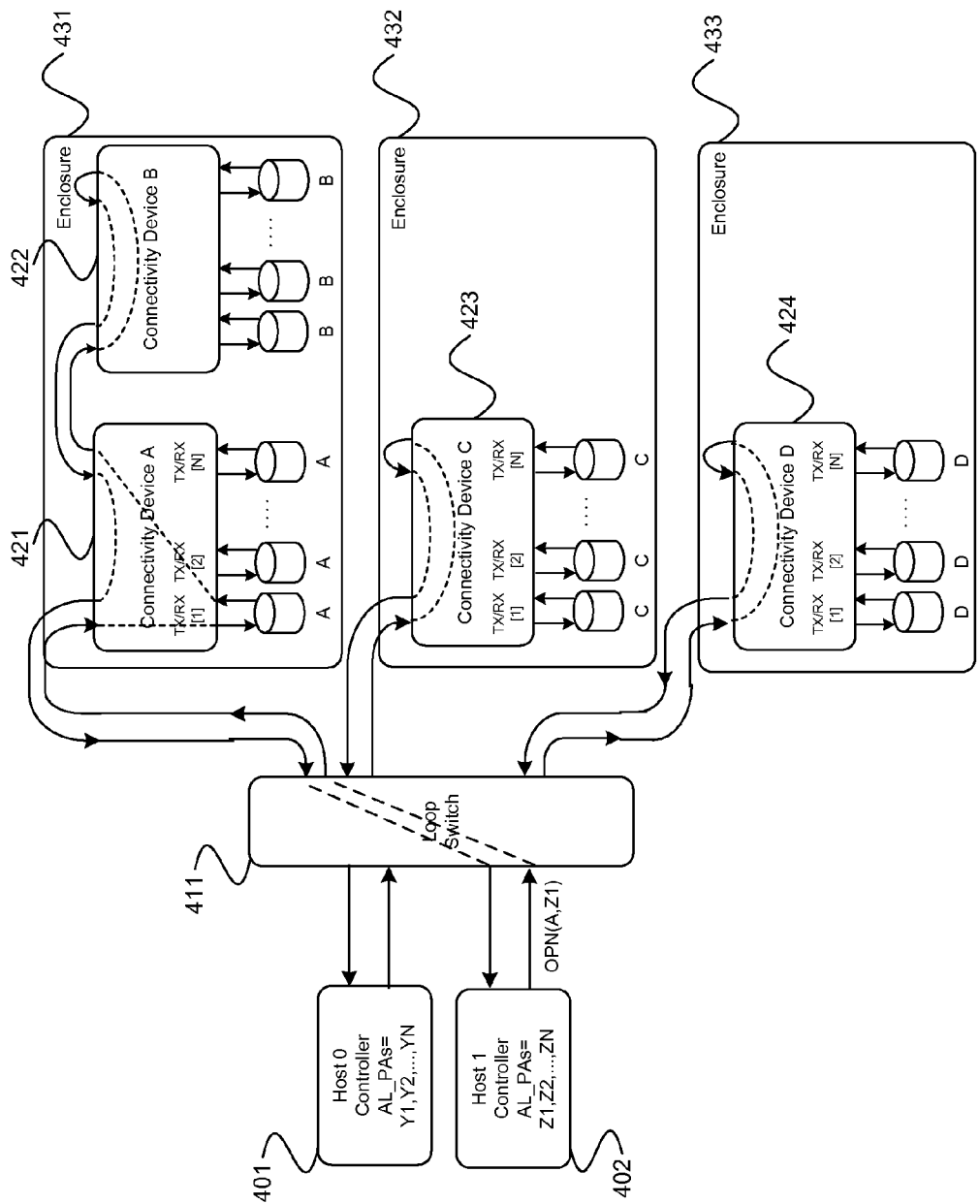
FIG. 4 illustrates a first embodiment of the present invention in which a connectivity device acquires a unique arbitrated loop destination address, and each drive acquires a shared arbitrated loop source address, and also shows an example of a connection created by a host sending an OPN primitive according to an embodiment of the present invention.

FIG. 4 illustrates a first embodiment of the present invention in which a connectivity device acquires a unique arbitrated loop destination address, and each drive connected to a connectivity device acquires this same arbitrated loop destination address acquired by the connectivity device. Host controllers 401 and 402 communicate via a loop switch 411 to a plurality of connectivity devices 421, 422, 423 and 424 housed within enclosures 431, 432 and 433 as illustrated. The controllers acquire as many AL_PAs as the maximum number of drives connected to each of the connectivity devices during loop initialization. These controller AL_PAs are unique in the loop and are unshared. The host controller 401 also acquires AL_PAs Y1, Y2, . . . , YN, while the host controller 402 also acquires AL_PAs Z1, Z2, . . . , ZN, where N is the maximum number of drives that can be connected to a connectivity device within an enclosure.

Each connectivity device manages or controls loop initialization across the drives attached to it in isolation from the rest of the loop. Each connectivity device 421, 422, 423 and 424 within each enclosure acquires one AL_PA during loop initialization that is unique on the loop. This unique and unshared AL_PA, or unique arbitration loop address, is used to arbitrate on behalf of the drives within the enclosure, since the AL_PAs acquired by the drives may not be unique on the loop. The drives connected to a connectivity device will each acquire a different AL_PA from the subset of AL_PAs that are not unique on the loop; these AL_PAs may be used again by other drives within other enclosures. These drive AL_PAs are shared. The drives attached to the connectivity devices do not participate in the loop initialization that occurs among the controllers and the connectivity devices' internal loop ports.

Each connectivity device blocks its attached drives from being part of the main loop initialization, and initiates loop initialization with each drive or all the drives connected to it depending on which method of address extending being used. As shown in FIG. 4, the connectivity devices acquire AL_PAs A, B, C and D on the main loop. In this illustration, Y1 through YN, Z1 through ZN, A, B, C and D each represent one of the 126 allowed 8-bit values of Arbitrated Loop Physical Addresses.

The drives connected to a connectivity device will each be forced to acquire the same AL_PA as acquired by the internal loop port of the connectivity device when initialized. The connectivity device can then force the drive to acquire certain addresses by setting bits in the initialization frames and only having one or a few bit set to "0". For example, all drives connected to connectivity device 421 are forced to acquire AL_PA A when each one independently initializes. Similarly, all drives connected to connectivity devices 422, 423 and 424 are forced to acquire AL_PA B, C and D, respectively, when each one independently initializes.

In this embodiment, the connectivity device is identified by an AL_PD, and each drive is identified by an AL_PS. The connectivity device in this embodiment forces each drive connected to it to acquire that same AL_PA it has acquired. When an OPN primitive is received with the AL_PD equal to the one acquired by the connectivity device, the connectivity device will use the AL_PS within the OPN to connect the traffic to the correct drive that is connected to it. The controller can re-use each AL_PS it has acquired to access a drive connected to the connectivity device within each enclosure by pairing it with the different AL_PDs acquired by each connectivity device, or each enclosure.

With respect to arbitration, in the embodiment of FIG. 4, the controllers (and any other devices attached directly to the loop) arbitrate in a manner that is no different from the standard definition of arbitration as described within the FC-AL standards since all AL_PAs acquired by each controller are unique within the loop. Each controller can use any of its acquired AL_PAs to arbitrate; the choice of AL_PA within each controller will depend on the mapping of AL_PS within the OPN primitive to each drive port on each connectivity device within the enclosures.

Arbitration from any of the drives connected to each connectivity device within the enclosures is handled within each connectivity device. Each connectivity device applies an arbitration method or arbitration algorithm across all drive ports and determines if any drive is trying to arbitrate and which one should win. An internal loop port state machine (LPSM) within the connectivity device will arbitrate on behalf of the drive ports using the AL_PA that is shared across all the drive ports and the connectivity device itself. Once the connectivity device wins arbitration, the drive port that won the arbitration across the drives is sent its AL_PA back to let the drive know that it has won arbitration and now may send an OPN and start its communication.

FIG. 4 also illustrates an example of a connection created by a host sending an OPN primitive according to an embodiment of the present invention. In a presently preferred embodiment, within an Arbitrated Loop, after a controller has arbitrated and won the use of the loop, that controller initiates communication to a drive by issuing an open primitive, such as a known OPN primitive. Within a standard arbitrated loop implementation, the AL_PD within the OPN(yx) issued by the controller represents the arbitrated loop address acquired by the device with which the controller desires to set up a connection. In contrast, in this embodiment, the AL_PD within the OPN(yx) issued by the controller represents a given connectivity device within an enclosure and all the drives attached to it, with one of those drives being the destined drive. The AL_PS is included within the OPN(yx) to indicate which drive connected to the connectivity device within the enclosure that should be opened and a connection created. In the embodiment of FIG. 4, the AL_PD identifies the connectivity device and is used to address each drive attached to the connectivity device, while the AL_PS is used in conjunction with the AL_PD to uniquely identify the destination drive.

Figure 5:
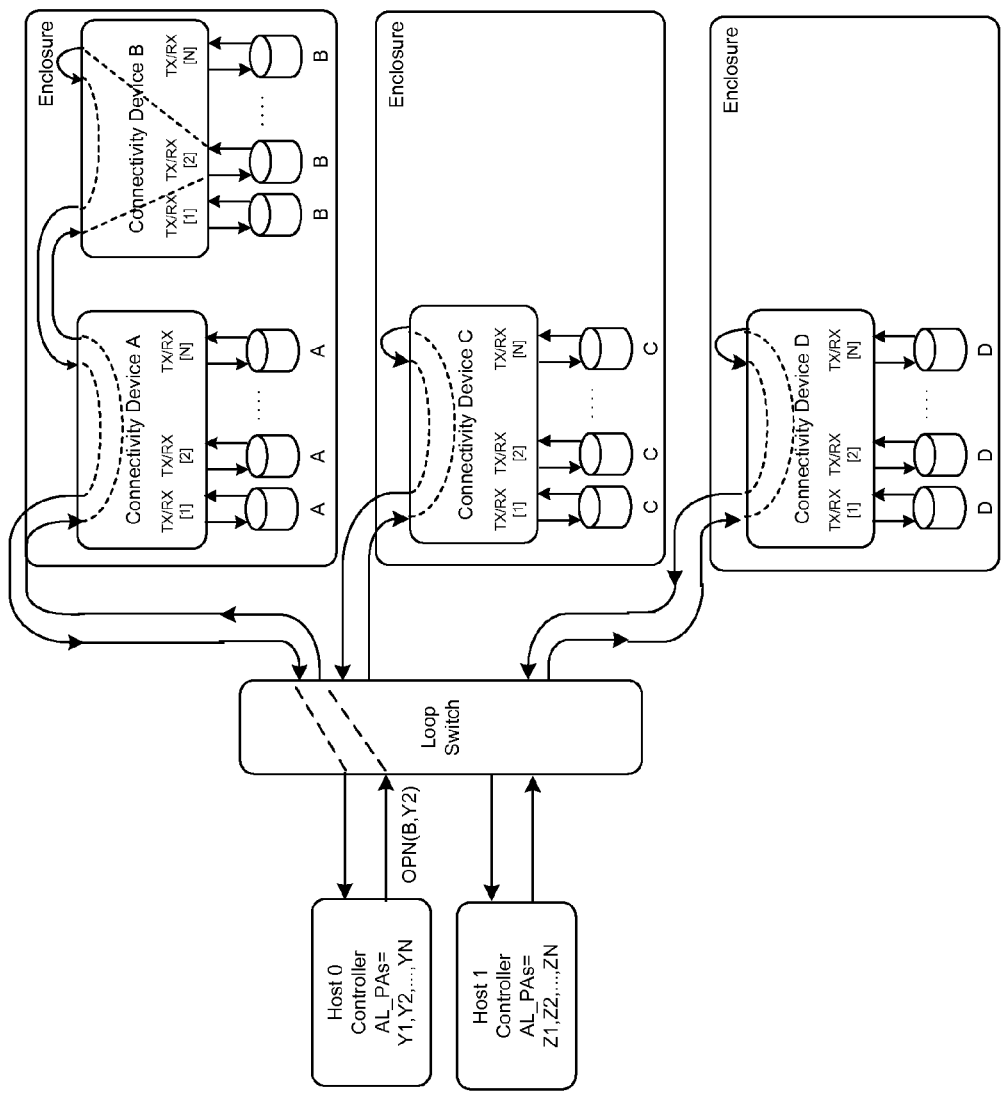
FIG. 5 illustrates another example of a connection created by a host sending an OPN primitive according to an embodiment of the present invention.
Figure 6:
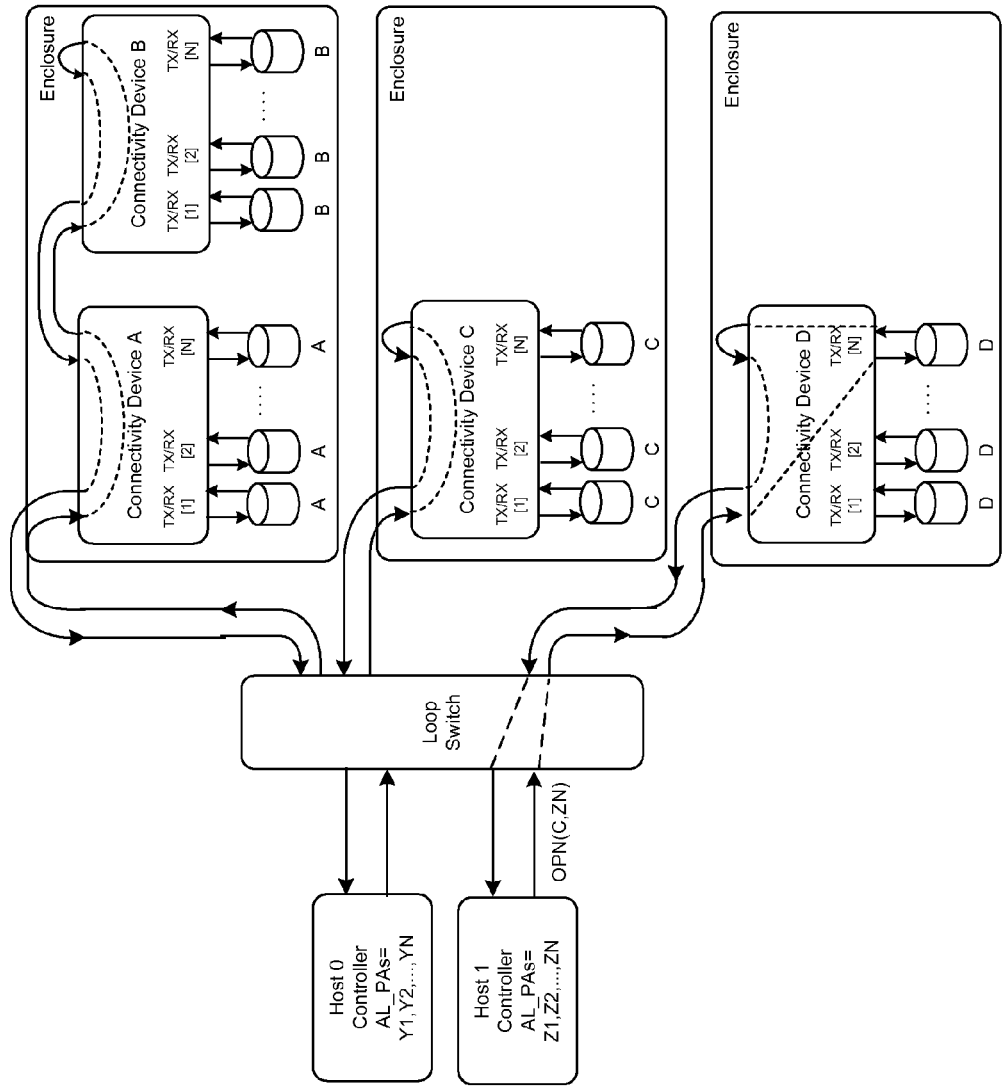
FIG. 6 illustrates a further example of a connection created by a host sending an OPN primitive according to an embodiment of the present invention.

Each connectivity device within each enclosure manages connections to each drive based on the AL_PS in the OPN. For example, OPN(A,Z1) opens the drive connected to port 1 of the connectivity device "A" as shown in FIG. 4. Similar illustrations are shown in FIG. 5 and FIG. 6. For example, OPN(B,Y2) opens the drive connected to port 2 of the connectivity device "B" as shown in FIG. 5. OPN(C,ZN) opens the drive connected to port N of connectivity device "C" as shown in FIG. 6.

In an embodiment, the present invention can be described as providing a connectivity device for use in a fiber channel arbitrated loop. The loop includes a plurality of connectivity devices and a plurality of sets of drives, each set of drives being connected to one of the connectivity devices. A selected set of drives is connected to the connectivity device. The connectivity device includes the following elements: a receiver to receive an open primitive having an arbitrated loop destination address and an arbitrated loop source address; a processor to determine if the open primitive is destined for a drive attached to the connectivity device based on an examination of both the arbitrated loop destination address and the arbitrated loop source address; and a connection manager to open a connection between the initiating controller and the destination drive in response to a determination that the destination drive is connected to the connectivity device.

The connectivity device can include a primitive router to forward the open primitive when the processor determines that the open primitive is destined for a drive that is attached to another connectivity device. The connectivity device can further include an initialization controller to block the selected set of drives from being part of initialization of the loop and to force the set of drives to acquire certain arbitrated loop physical addresses based on bit settings in initialization frames.

Figure 7:
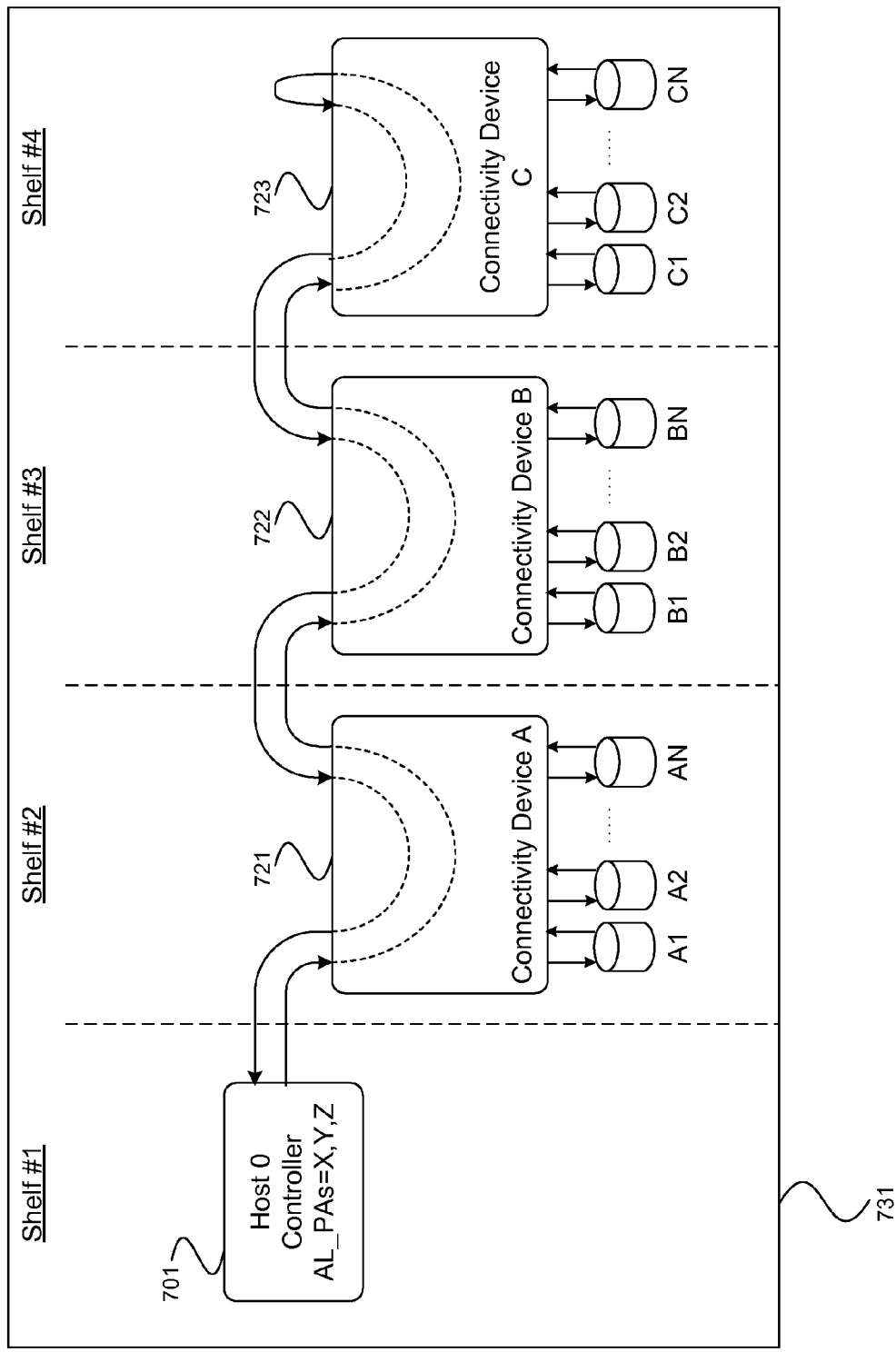
FIG. 7 illustrates a second embodiment of the present invention in which a connectivity device acquires a unique arbitrated loop source address, and each drive acquires a shared arbitrated loop source address.

FIG. 7 illustrates a second embodiment of the present invention in which a connectivity device acquires a unique arbitrated loop source address, and each drive acquires a shared arbitrated loop destination address. In this case, each connectivity device still acquires a unique AL_PA, and each drive acquires a different AL_PA from the subset of AL_PAs that are not unique on the loop. This exemplary embodiment shows a single host controller 701 controlling a plurality of connectivity devices 721, 722 and 723, with each of these elements being housed on different shelves within a single enclosure 731. The AL_PAs A, B, C, X, Y, Z, A1 through AN, B1 through BN, and C1 through CN illustrated in FIG. 7 each represent one of the 126 allowed 8-bit values of Arbitrated Loop Physical Addresses. The Host Controller 701 acquires AL_PAs X, Y, and Z. The AL_PAs X, Y and Z are all unique on the loop. Each connectivity device within each enclosure acquires a unique AL_PA per enclosure. The connectivity devices 721, 722 and 723 each acquire AL_PAs A, B and C, respectively.

The drives connected to connectivity device 721 acquire AL_PAs "A1" through "AN" when the drives initialize as a group. Similarly, the drives connected to connectivity devices 722 and 723 acquire AL_PAs "B1" through "BN" and AL_PAs "C1" through "CN", respectively, when the drives initialize as a group. As already stated above, the AL_PAs acquired by the drives may not be unique, i.e. A1, B1 and C1 may all be the same AL_PA. In FIG. 7, if A1, B1 and C1 are the same AL_PA, then drive "A1" can be accessed by OPN (A1,X); drive "B1" can be accessed by OPN(B1,Y); and drive "C1" can be accessed by OPN(C1,Z). This illustrates the fact that in this embodiment, the shared drive AL_PA is the arbitrated loop destination address, and the unique connectivity device AL_PA is the arbitrated loop source address.

Loop initialization for this embodiment advantageously occurs in two stages. The first stage of initialization is to acquire all unique AL_PAs on the main control loop—this includes the multiple AL_PAs for controllers and the one unique AL_PA per enclosure. The controllers and each enclosure's connectivity device's internal LPSM participate in this stage of loop initialization; the drives do not participate at this stage. The connectivity devices will not route any of the loop initialization frames to the drives.

The second stage of initialization is where the drives acquire AL_PAs. This preferably occurs in parallel across the enclosures. Loop initialization occurs within each enclosure involving only the connectivity device's internal LPSM and the drives within the enclosure. The connectivity device drives the enclosure's loop initialization. The initial LIFA frame will have all the loop IDs that are reserved for the controllers pre-marked and also all the unique loop IDs that have been acquired for each enclosure during the main control loop's initialization.

With respect to arbitration in this embodiment, the controller arbitrates and wins the loop with use of any of its acquired AL_PAs as extracted from the S_ID in its Frame Header. Each connectivity device within each enclosure has acquired one unique AL_PA on the loop that will be used to arbitrate for the rest of the non-unique AL_PAs associated with the drives in that enclosure.

With respect to communication after arbitration, in the embodiment of FIG. 7, the AL_PS within the OPN(yx) issued by a controller represents an enable to the enclosure or connectivity device within an enclosure. Each connectivity device will include logic that is able to filter communication to the drives attached to it based on the AL_PS within the OPN(yx) received. If the AL_PS within the OPN(yx) received by a connectivity device is determined to match that of an allowable source, then the OPN(yx) is directed toward the connected drive that has acquired an arbitrated loop address that matches the AL_PD. All other enclosures will ignore the OPN since the AL_PS will not match their allowed source's address.

Figure 8:
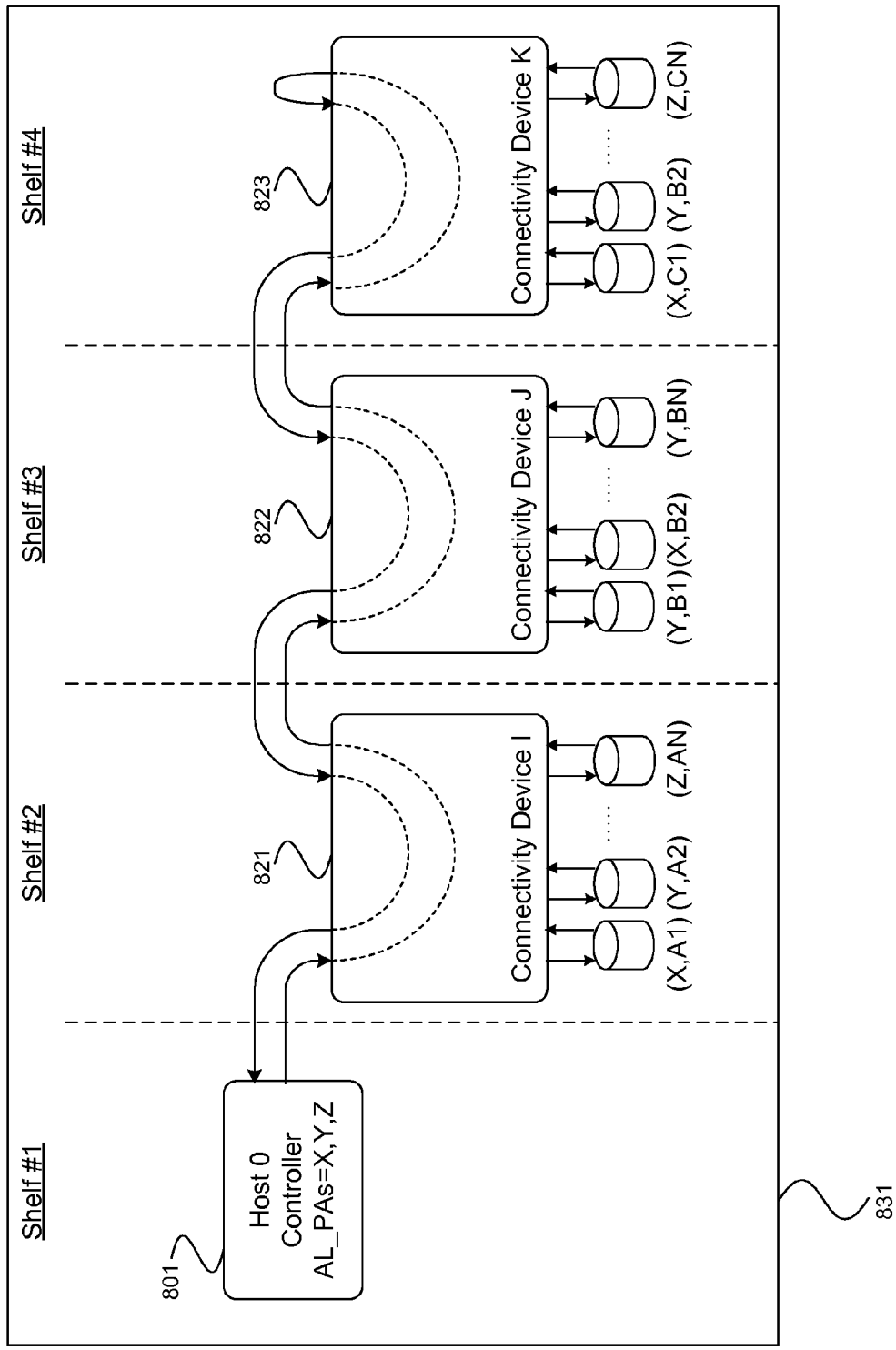
FIG. 8 illustrates a further embodiment of the present invention, in which an arbitrated loop source address and arbitrated loop source address pairing identifies each drive within each enclosure.

FIG. 8 illustrates a further embodiment of the present invention, in which an arbitrated loop source address and arbitrated loop source address pairing identifies each drive within each enclosure. This embodiment is similar to the previously described embodiments, except that a single AL_PA is not used to identify the enclosure or connectivity device that should have the destined drive attached to it. Instead, the AL_PS and AL_PD are used as part of a comparison on a per drive basis.

As shown in FIG. 8, a host controller 801 controls a plurality of connectivity devices 821, 822 and 823, with each of these elements being housed on different shelves within a single enclosure 831. The host controller 801 acquires AL_PAs X, Y, Z. During initialization, each connectivity device acquires a unique AL_PA during initialization, but this AL_PA is not used for drive addressing. For example, connectivity devices 821, 822 and 823 acquire AL_PAs I, J and K, respectively. According to a suitable acquisition scheme, each drive connected to each connectivity device acquires an AL_PS, AL_PD pair that together uniquely identify the drive. For example, connectivity device 821 acquires AL_PA I for arbitration purposes. However, exemplary drives connected to connectivity device 821 have AL_PS, AL_PD pairs (X,A1), (Y,A2) and (Z,AN), illustrating that these pairs do not share an AL_PA with the connectivity device. The exemplary drives connected to connectivity device 822 have AL_PS, AL_PD pairs (Y,B1), (X,B2) and (Y,BN), showing that not only do the drives not use their connectivity device's AL_PA for addressing or arbitration, but also that the same AL_PS or AL_PD can be repeated within the set of drives connected to the connectivity device, as long as the pairing is unique for each drive. This is also illustrated by the pairs (X,C1), (Y,B2) and (Z,CN) used to uniquely address the drives connected to connectivity device 823.

Each connectivity device in FIG. 8 includes logic to examine both the AL_PS and AL_PD within the OPN(yx) to see if there is a mapping to one of the attached drives. Arbitration still occurs by the connectivity device arbitrating on behalf of the attached drives with its unique AL_PA. Loop initialization happens at the main loop level for acquisition of the unique AL_PAs on the loop. Drive initialization is preferably controlled by the connectivity device to force the drive to acquire the desired AL_PA pair.

Embodiments of the present invention as described, in which a pairing of the source and destination AL_PAs is used to extend the number of addressable nodes within a FC Arbitrated Loop, can also be useful to solve other problems within an arbitrated loop. The first advanced application is to utilize the preferred embodiment described earlier where an entire shelf acquires the same destination AL_PA and then add in the ability to combine or aggregate the traffic within one tenancy connection between the host controller and all the drives in the enclosure. This advanced application preferably requires that the source AL_PA from the host be extracted from the header information within the frame since a separate OPN will not be sent for frames to each drive in the enclosure. This advanced application allows more efficient traffic flow with greater usage of the full-duplex bandwidth available. Normally, traffic within a FC loop only utilizes about half of the bandwidth available.

A second advanced application is for Virtual Storage Area Networks (VSANs). Some implementations by other companies show an 8 to 24-bit tag field (VSAN tag) added to the front of a FC frame and VSAN capable switches would route based on the VSAN tag. An assumption is being made that either a switch or controller prior to the frame being sent to an arbitrated loop would remove the VSAN tag. A controller can map the VSAN tag to a certain source AL_PA and use an embodiment described earlier to create virtual loops connected to the same controller.

A third advanced application is for zoning within the arbitrated loop. The different zones can be represented by the controller's source AL_PA used in the OPN.

Embodiments of the present invention described above can be implemented within a Cut-Through Switch or other switch for FC Arbitrated Loop. This device can work in conjunction with any of the Tachyon controllers that support the Multiple Node ID (MNID) mode.

Figure 9:
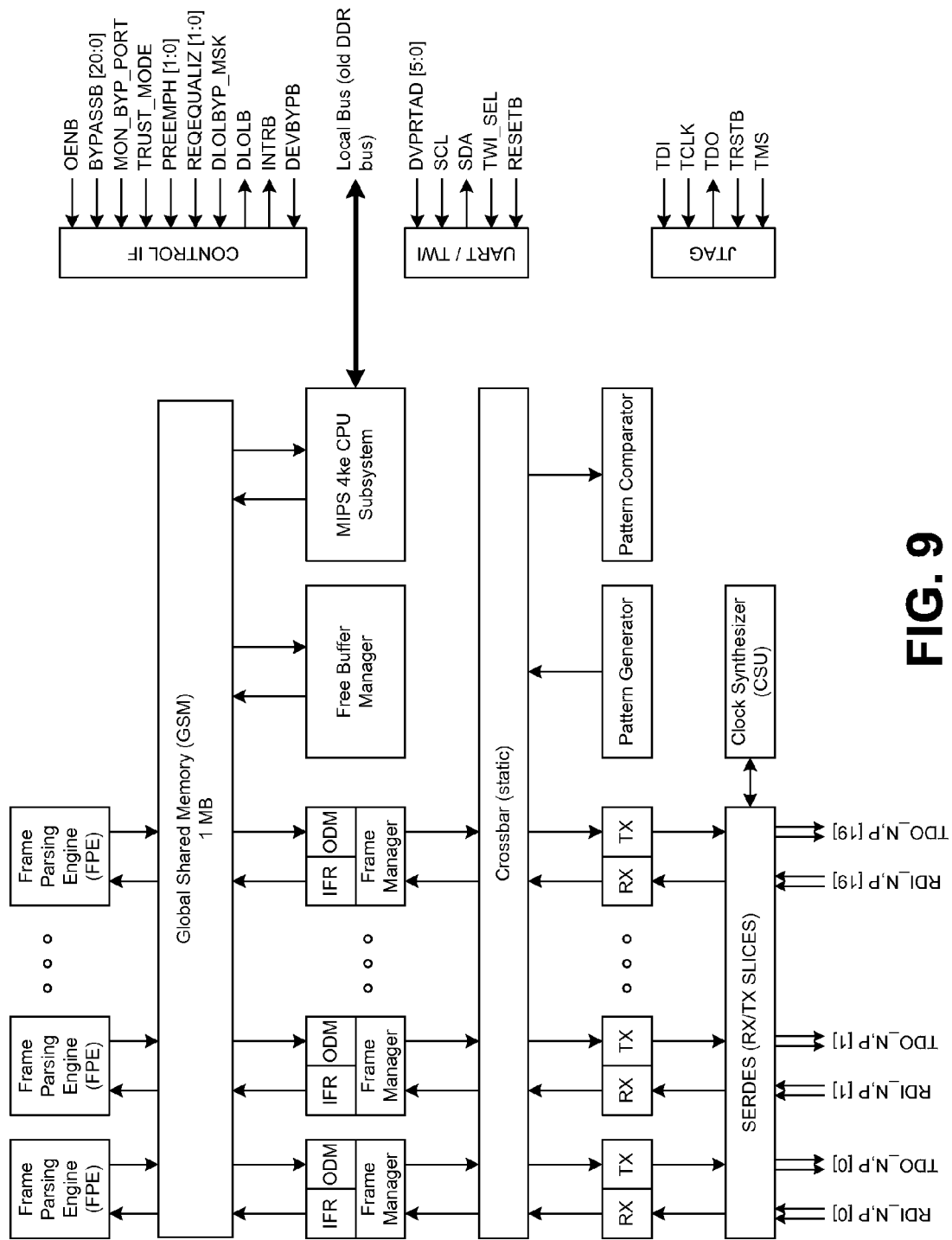
FIG. 9 illustrates a block diagram of a switch including an embodiment of the present invention.

FIG. 9 illustrates an exemplary architecture of such a switching device incorporating an embodiment of the present invention. In FIG. 9, the main purpose of the Global Shared Memory is for re-timing traffic between two nodes on the loop running at different speeds. A more simple, physical embodiment of this invention does not require buffering of frames if all node ports on the loop are running at the same speed.

Embodiments of the present invention are applicable to all connection devices and methodologies of connection and addressing within a FC Arbitrated Loop. It can be used to extend the number of drives allowed by the FC_AL standard within one loop by allowing AL_PAs to be acquired by multiple node ports and differentiation between these ports is made by the source AL_PA within the OPN issued or extracted from the frame header. The invention can also be used anywhere within an arbitrated loop that pairing of the source AL_PA with the destination AL_PA would add an extra dimension of discrimination in creating datapath connections between two node ports.

Known FC-AL addressing and communication approaches only have half-duplex communication, even though they use a full duplex channel. By virtualizing certain nodes, embodiments of the present invention enable full duplex communication in FC-AL.

The present invention described above enable a larger number of drives to be added to a standard FC Arbitrated Loop without incurring the hardware costs associated with the standard practice of adding a switch and more controllers to create separate loops and increase drive count. There is also an added complexity of supporting fabric services and the public loop profile when adding a switched fabric port.

In an aspect, the present invention provides a method of addressing within a FC Arbitrated Loop that extends the number of addressable node ports beyond 126. The method can assign some of the available AL_PAs to multiple node ports by adding routing/connection dependence to the source AL_PA. The routing/connection dependence can be based on comparing the source AL_PA to a set of allowed source AL_PAs to determine whether to route data to a node or set of nodes. The routing/connection dependence can be based on comparing the source AL_PA to a set of allowed source AL_PAs and determines to route data to a node or set of nodes, further comparison of the destination AL_PA determines whether to create a connection to the node or one of the nodes. The routing/connection dependence can utilize the destination AL_PA to represent a set of nodes. The routing/connection dependence can utilize the destination AL_PA to represent a set of nodes and further utilizes the source AL_PA to determine the specific node within that set of nodes to create a connection with.

In another aspect, the present invention provides a method to establish connections between controllers and drives based on a pairing of source and destination AL_PAs, not just on the destination AL_PA as defined in a strictly standard loop implementations. The method can include a method of enabling a connection to an enclosure by comparing the source AL_PA in the OPN(yx) primitive to an established source AL_PA that is allowed to create a connection with that enclosure. The method can include a method of enabling a connection to an enclosure by utilizing the destination AL_PA in the OPN(yx) to represent the connectivity device and all the drives attached to it. The method can also determines which drive attached to the connectivity device to connect to based on the source AL_PA.

In a further aspect, the present invention provides a connectivity device such as a loop hub, port bypass controller, cut-through switch or loop switch within each FC enclosure which is capable of filtering communication to the attached drives based on the source AL_PA or further directing communication to a specific drive based on the source AL_PA.

In the above description, for purposes of explanation, numerous details are set forth in order to provide a thorough understanding of the present invention. However, it will be apparent to one skilled in the art that these specific details are not required in order to practice the present invention. In other instances, well-known electrical structures and circuits are shown in block diagram form in order not to obscure the present invention. For example, specific details are not provided as to whether the embodiments of the invention described herein are implemented as a software routine, hardware circuit, firmware, or a combination thereof.

Embodiments of the invention may be represented as a software product stored in a machine-readable medium (also referred to as a computer-readable medium, a processor-readable medium, or a computer usable medium having a computer readable program code embodied therein). The machine-readable medium may be any suitable tangible medium, including magnetic, optical, or electrical storage medium including a diskette, compact disk read only memory (CD-ROM), memory device (volatile or non-volatile), or similar storage mechanism. The machine-readable medium may contain various sets of instructions, code sequences, configuration information, or other data, which, when executed, cause a processor to perform steps in a method according to an embodiment of the invention. Those of ordinary skill in the art will appreciate that other instructions and operations necessary to implement the described invention may also be stored on the machine-readable medium. Software running from the machine readable medium may interface with circuitry to perform the described tasks.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A method of loop initialization in a fiber channel arbitrated loop, the loop including a plurality of connectivity devices and a plurality of sets of drives, each set of drives being connected to one of the connectivity devices, the method comprising:
   acquiring, at a selected connectivity device, a unique arbitrated loop physical address; and
   acquiring, at each drive in a set of drives attached to the selected connectivity device, a shared arbitrated loop physical address, the shared arbitrated loop physical address being part of a set of shared arbitrated loop physical addresses shared among the connectivity devices, each drive in the set of drives being uniquely addressable using a pairing of the shared loop physical address associated with each of the drives in the set of drives and the unique arbitrated loop physical address associated with the selected connectivity device; and
   further comprising, at the connectivity device:
   blocking the set of drives attached to the connectivity device from being part of initialization of the loop; and
   forcing the set of drives attached to the connectivity device to acquire certain arbitrated loop physical addresses based on bit settings in initialization frames.

2. The method of claim 1 wherein the unique arbitrated loop physical address comprises an arbitrated loop destination address and the shared arbitrated loop physical address comprises an arbitrated loop source address.

3. The method of claim 1 wherein the unique arbitrated loop physical address comprises an arbitrated loop source address and the shared arbitrated loop physical address comprises an arbitrated loop destination address.

4. The method of claim 1 further comprising, at a controller:
   acquiring a controller unique arbitrated loop physical address for the controller; and
   acquiring as many shared arbitrated loop physical addresses as a maximum number of drives attached to each connectivity device connected to the controller.

5. The method of claim 1 further comprising, at a controller:
   acquiring a controller unique arbitrated loop physical address for the controller; and
   acquiring as many unique arbitrated loop physical addresses as a maximum number of connectivity devices connected to the controller.

6. The method of claim 1 further comprising, at a controller:
   acquiring a controller unique arbitrated loop physical address for the controller; and
   acquiring as many unique arbitrated loop physical addresses as a maximum number of enclosures in the loop.

7. The method of claim 1 further comprising, at a controller:
   acquiring a controller unique arbitrated loop physical address for the controller; and
   acquiring as many unique arbitrated loop physical addresses as a maximum number of shelves in the loop.

8. A fiber channel arbitrated loop addressing architecture, comprising:
   a plurality of unique arbitrated loop physical addresses for association with a plurality of controllers and a plurality of connectivity devices; and
   a set of shared arbitrated loop physical addresses for association with a plurality of sets of drives, each set of drives connected to one of the plurality of connectivity devices, the same set of shared loop physical addresses being re-usable by each set of drives to enable unique identification of a drive on the loop using a pairing of a shared loop physical address associated with the drive and a unique arbitrated loop physical address associated with a connectivity device to which the drive is connected.

9. The addressing architecture of claim 8 wherein the plurality of unique arbitrated loop physical addresses comprise arbitrated loop destination addresses and the set of shared arbitrated loop physical addresses comprise an arbitrated loop source addresses.

10. The addressing architecture of claim 8 wherein the plurality of unique arbitrated loop physical addresses comprise arbitrated loop source addresses and the set of shared arbitrated loop physical addresses comprise an arbitrated loop destination addresses.

\* \* \* \* \*